May 30, 1967 H. CHANOWITZ 3,322,524
METHOD OF AND AN APPARATUS FOR MAKING SEALED SWITCHES
Filed Oct. 28, 1963 3 Sheets-Sheet 1
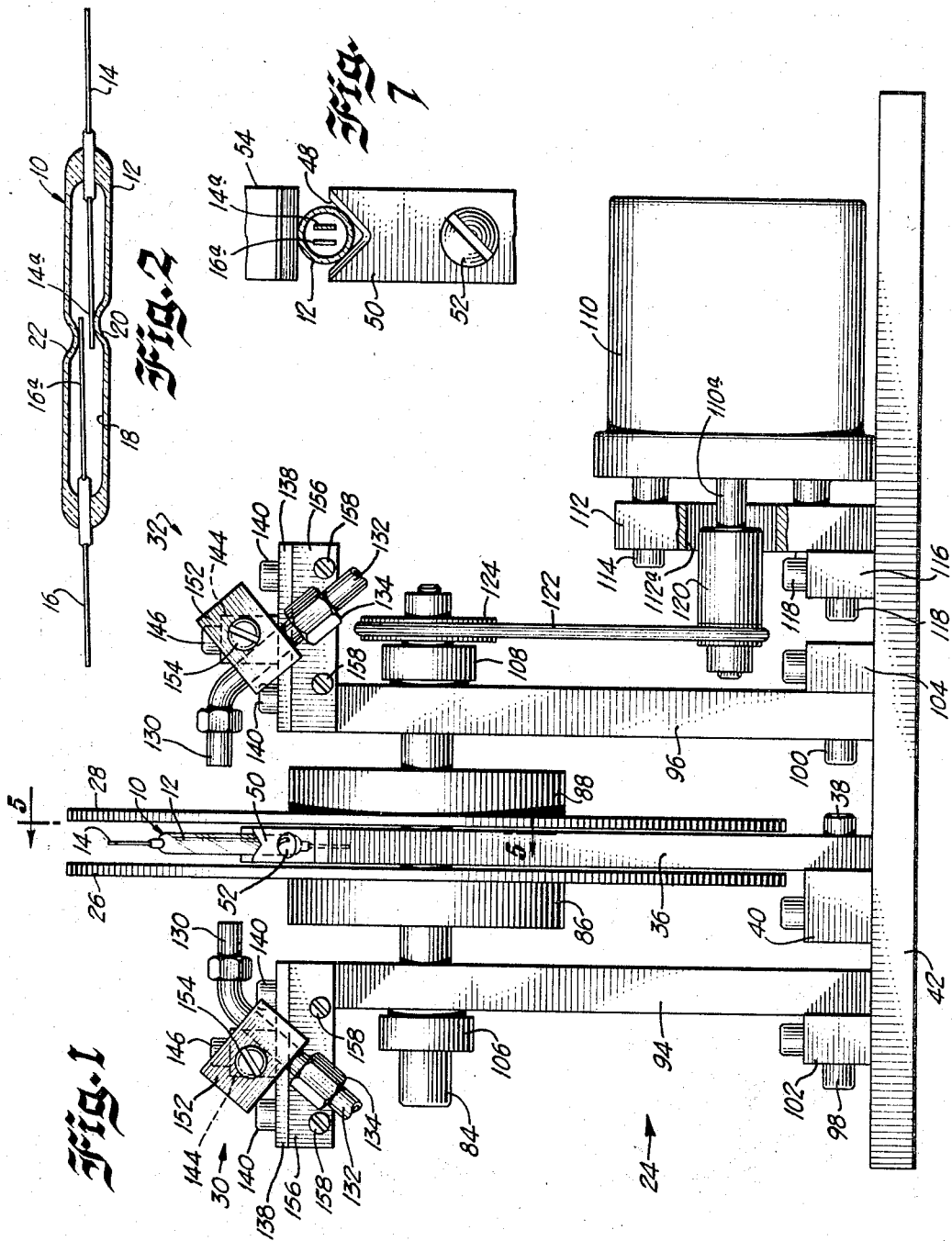
INVENTOR
HARRY CHANOWITZ
by
Mason, Kolehmainen, Rathburn and Wyss
ATTORNEYS

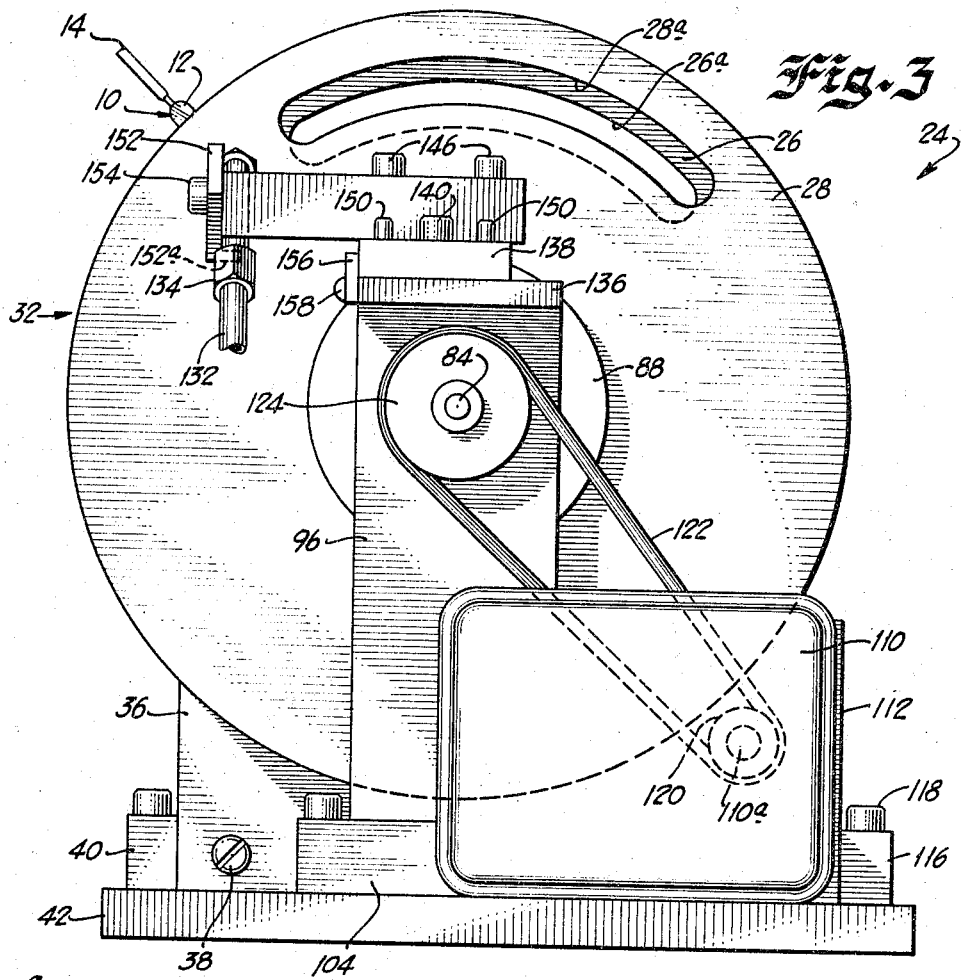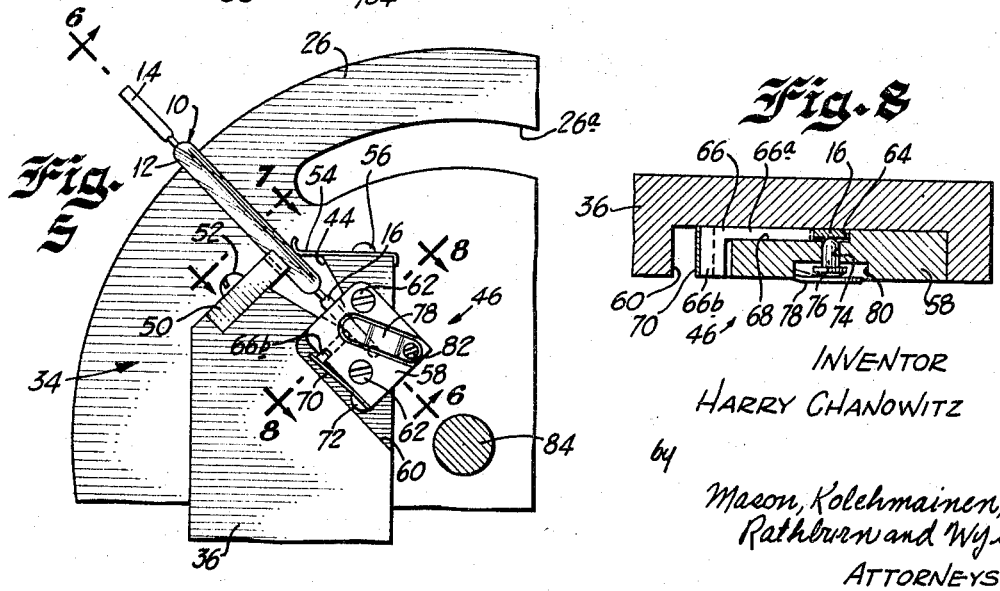

May 30, 1967　　　　H. CHANOWITZ　　　　3,322,524
METHOD OF AND AN APPARATUS FOR MAKING SEALED SWITCHES
Filed Oct. 28, 1963　　　　　　　　　　　　3 Sheets-Sheet 3

INVENTOR
HARRY CHANOWITZ
by Mason, Kolehmainen, Rathburn and Wyss
ATTORNEYS.

3,322,524
METHOD OF AND AN APPARATUS FOR MAKING SEALED SWITCHES

Harry Chanowitz, Skokie, Ill., assignor to C. P. Clare & Company, Chicago, Ill., a corporation of Delaware
Filed Oct. 28, 1963, Ser. No. 319,383
15 Claims. (Cl. 65—110)

This invention relates to a method of and an apparatus for making sealed switches of the type having a dielectric housing including projections or depressions for engaging end portions of magnetic elements or reeds sealed in the housing.

A switching matrix using sealed switches with means for damping or preventing oscillation of the magnetic reeds in the switches to provide a matrix capable of high speed operation is disclosed in the contemporaneously filed application of John Kutyla, Ser. No. 319,457, which application is assigned to the same assignee as the present application. This damping means included in the sealed switches comprises a pair of depressions or projections formed integral with the glass housing and extending into proximity to or engagement with the free ends of the magnetic elements or reeds in the area in which these ends are overlapped. The Kutyla application discloses one method of and an apparatus for making sealed switches including the damping depressions that uses selectively applied bodies of heat absorbing material. Although this method produces excellent switches, the speed at which the depressions can be formed is not as fast as would be desirable in certain applications.

Accordingly, one object of the present invention is to provide a new and improved method of and an apparatus for making sealed switches.

Another object is to provide an apparatus for forming precisely located depressions in the glass housing of a sealed switch by applying controlled quantities of heat from one or a plurality of torch means.

Another object is to provide an apparatus for forming precisely located depressions in the glass housing of a sealed switch including one or more torch means having flames directed at the areas on the housing in which the depressions are to be formed and one or more movable members having apertures or openings selectively movable into alignment with the flames to apply controlled quantities of heat to the selected areas.

Another object is to provide an apparatus for forming accurately located depressions in the glass housing of a sealed switch including an aperture and rotatable heat shielding structure containing a fixedly mounted sealed switch and torch means aligned with areas on the housing of the switch in which depressions are to be formed for selectively applying controlled quantities of heat to the housing as the heat shielding structure is rotated.

A further object is to provide a method of making depressions in the glass housing of a sealed switch in which the switch is heated to increase the normal subatmospheric pressure within the housing to provide a desired pressure differential across the housing before localized heat sufficient to soften the areas of the glass in which the depressions are to be formed is applied.

Another object is to provide a method of making depressions in the glass housing of a sealed switch in which heat is applied to the housing to concurrently control the pressure differential across the wall of the housing and soften the glass to produce a depression.

Another object is to provide a method of making accurately located depressions in the glass housing of a sealed switch in which sealed switches are successively fed to a position adjacent the path of movement of a cyclically or repetitively moved heat shielding means to receive a controlled quantity of heat at an accurately located point which passes through an aperture or opening in the heat shielding means from an adjacent heat source.

In accordance with these and many other objects, one embodiment of the invention comprises a method of and an apparatus for forming depressions or projections in the glass housing of a sealed reed switch of the type having magnetic elements sealed in the opposite ends of the housing with their inner ends normally disposed in an overlapping and spaced relationship. The depressions are formed integral with the glass of the housing to engage the reeds adjacent their free ends to provide means for damping or preventing oscillation of these elements when the sealed switch is released.

The depressions in the glass housing of the sealed switch are formed by an apparatus including a pair of spaced torch means having flames directed toward the areas on the glass switch in which the depressions are to be formed. A pair of heat shielding members or plates are rotatably mounted at positions interposed between the switch and each of the torches and are provided with openings aligned with the areas in which the depressions are to be formed. When the heat shielding members or plates are rotated, the openings are periodically moved into alignment with the torch means to apply a controlled quantity of heat to the selected areas on the glass housing.

When the depressions are to be formed in the sealed switches, a drive means is placed in operation to continuously rotate the heat shielding means or plates about their axis of rotation so that the openings periodically move ino alignment with the spaced flames continuously developed by the torch means. Each of the sealed switches is heated to establish a desired pressure differential between the subatmospheric pressure within the sealed housing and the atmosphere. The sealed switch is then inserted between the heat shielding members so that localized heat is supplied by the flames to the selected areas on the housing in the interval in which the openings in the heat shielding members are aligned with the torch means.

This application of localized and relatively intense heat softens the glass in the selected areas of the housing to permit it to flow inwardly under both the pressure of the flame and the pressure differential existing across the wall of the glass housing. When the softened portions of the glass forming the depressions move into engagement with the adjacent portions of the magnetic elements, these elements mechanically obstruct further inward movement of the glass and also serve as a heat sink to remove heat from the softened glass to prevent further inward movement thereof. The removal of heat through the engaged magnetic elements and the mechanical obstruction of the flow of glass by engagement with the magnetic elements insures that the molten glass does not alter the gap between the overlapping ends of the magnetic elements and, thus, the operating sensitivity of the sealed switch. The heated sealed switch is replaced by another during each cycle of rotation of the heat shields, and the removed switch is permitted to cool to solidify the previously formed projections. During the next cycle of rotation of the heat shielding members, an additional preheated sealed switch is inserted between the shielding members.

Many other objects and advantages of the present invention will become apparent from considering the following detailed description in conjunction with the drawings, in which:

FIG. 1 is a front elevational view of an apparatus for forming depressions in a sealed switch which embodies the present invention;

FIG. 2 is a sectional view of a sealed switch including the damping depressions;

FIG. 3 is an end elevational view of the switch making apparatus;

FIG. 7 is an enlarged sectional view taken along line 7—7 in FIG. 5;

FIG. 8 is an enlarged sectional view of a locating assembly taken along line 8—8 in FIG. 5; and FIG. 9 is an enlarged sectional view similar to FIG. 6.

Figure 4:
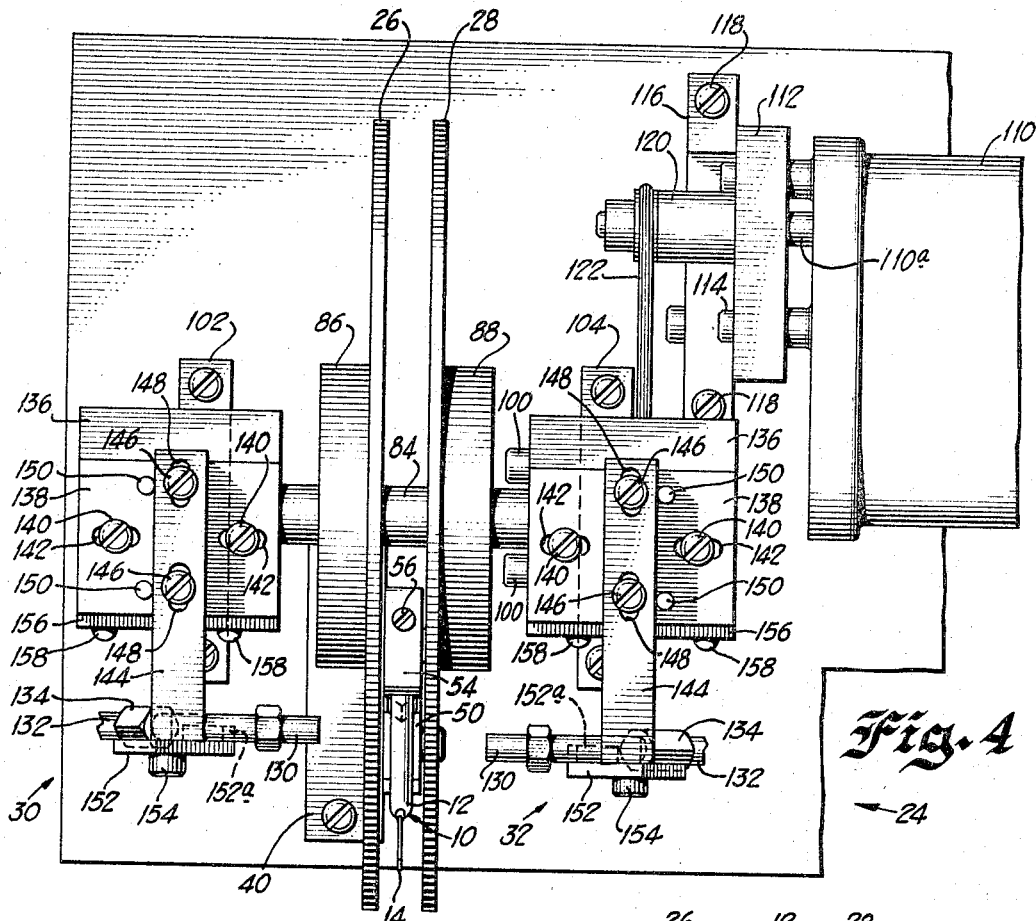
FIG. 4 is a top elevational view of the switch making apparatus.

The present invention is directed to an apparatus for and a method of making a sealed switch 10 of the type illustrated in FIG. 2 of the drawings. This switch includes an elongated dielectric or glass housing 12 in the opposite ends of which a pair of magnetic reeds or elements 14 and 16 are sealed with a cavity 18 defined by the sealed housing 12 being at a subatmospheric pressure. The inner free ends 14a and 16a of the magnetic elements 14 and 16 are normally disposed in a spaced and overlapping relationship from which they are moved into engagement by the application of a magentic field of a given strength. When the switch 10 is released by the removal of the magnetic field, the resilience of the elements 14 and 16 separates the ends 14a and 16a to permit them to move the normal position shown in FIG. 2. During this separation, there is a tendency for the end portions 14a and 16a to oscillate with the result that the immediate reapplication of a magnetic field having a value less than that normally required to operate the switch 10 could result in reoperation thereof. To avoid this oscillation or "flagging" of the free end portions 14a and 16a, the housing 12 is provided with a pair of integrally formed depressions or projecting portions 20 and 22 which engage the free ends 14a and 16a in their normal position. When the switch 10 is released, the impact between the free ends 14a and 16a and the projections 20 and 22, respectively, prevents oscillatory movement thereof and avoids false operation of the switch 10. Since the operating characteristic of the switch 10 is due in large part to the spacing between the overlapping ends 14a and 16a, it is necessary in manufacturing the switch 10 to insure that the depressions 20 and 22 do not change this gap and the operating characteristic of the switch 10.

The sealed switch 10, without the depressions 20 and 22, can be manufactured by using well-known methods and apparatus such as those described and shown in detail in United States Patent Nos. 2,697,307; 2,882,648; 2,984,046; and 3,061,144. The depressions 20 and 22 are formed in the glass housing 12 of the switch 10 in accurately located positions relative to the ends 14a and 16a of the magnetic elements 14 and 16 by an apparatus 24 (FIG. 1) which embodies the present invention. The sealed switch 10 is mounted in the apparatus 24 in a fixed position between a pair of rotating heat shields or plates 26 and 28 having apertures therein movable into alignment with the areas on the housing 12 in which the depressions 20 and 22 are to be formed. A pair of torch means indicated generally as 30 and 32 (FIGS. 1 and 4) are mounted on opposite sides of the switch 10 with the plates 26 and 28 disposed therebetween so that the rotation of the plates 26 and 28 momentarily moves the openings therein into alignment with the flames projecting from the torch means 30 and 32 to apply a controlled quantity of heat to the exposed portions of the glass housing 12. This softens the glass and permits it to be displaced to form the depressions 20 and 22.

Figure 5:
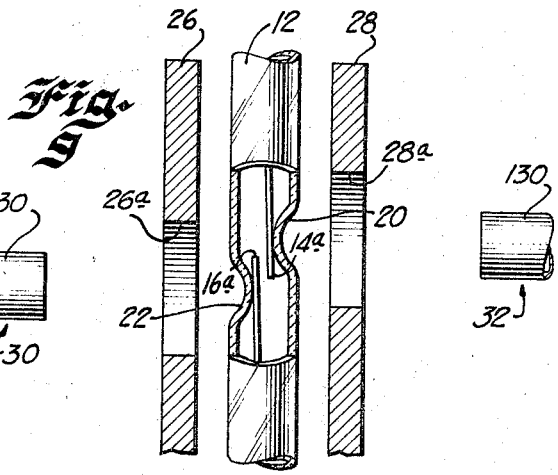
FIG. 5 is a fragmentary sectional view taken along line 5—5 of FIG. 1.

The sealed switch 10 is held in a predetermined and aligned position between the heat shields or plates 26 and 28 by a holding fixture indicated generally as 34 (FIG. 5) including a supporting element 36 that is secured at its lower end by a plurality of machine screws 38 (FIG. 1) to a block 40 carried on a base or supporting structure 42. The upper end of the supporting element 36 includes a somewhat V-shaped notch or opening 44 (FIG. 5) terminating at its inner end in an aligning assembly indicated generally as 46. To support the switch 10 on the holding assembly 34, an inner end portion of the switch housing 12 is received within a generally V-shaped opening 48 (FIG. 7) in an element 50 secured to a recessed portion at the upper end of the supporting element 46 by a screw 52 (FIG. 5). This portion of the housing 12 is resiliently biased into engagement with the walls of the V-shaped opening 48 by a flat spring 54 (FIGS. 5 and 7) that is secured to an upper end of the standard or supporting element 36 by a screw 56.

The aligning fixture or assembly 46 receives the outer end of the magnetic element or reed 16 and orients the sealed switch 10 with respect to the apparatus 24 so that the flattened portions of the reeds 14 and 16 extend generally parallel to the heat shields or plates 26 and 28 with the portions of the glass housing 12 in which the depressions 20 and 22 are to be formed disposed in predetermined positions relative to plates 28 and 26 respectively. The assembly 46 comprises a member 58 (FIGS. 5, 6 and 8) secured within a recess 60 in the member 36 by a plurality of machine screws 62 (FIG. 5). The inner wall of the member 58 is provided with a groove or recess 64 having a flared outer end which cooperates with the adjacent wall of the member 36 to define a passageway in which the magnetic element 16 on the switch 10 is slidably received. Insertion of the sealed switch 10 into the assembly 46 is limited by the engagement of the end of the reed 16 with a pin 65 (FIG. 6) which is carried on the element 36 and which includes an end extending across the slot formed by the groove 64. The magnetic element 16 is resiliently biased against the side wall of the recess 64 by a generally L-shaped member 66 (FIG. 8) having one leg 66a slidably received in a passageway formed by a transversely extending recess or groove 68 in the member 58. The other leg 66b of the member 66 is engaged by a flat spring 70 that is secured at one end to the member 58 by a screw 72 (FIG. 5). The member 66 engages one edge of the magnetic element 16 received within the passageway formed by the recess 64 and biases the opposite edge into engagement with the vertically extending wall of the recess 64 (FIG. 8).

The planar side surface of the magnetic element 16 is also resiliently biased into engagement with the adjacent wall of the recess 60 in the supporting element 36. More specifically, the member 58 is provided with a hole 74 (FIG. 8) in which is slidably mounted a headed plunger 76. The head of the plunger 76 is engaged by a flat spring 78 which is disposed within a recess 80 in the member 58 and which is secured to this member at one end by a machine screw 82 (FIG. 5). The resilient bias applied to the plunger 76 by the flat spring 78 forces the inner end of the plunger 76 against one flat surface of the magnetic element 16 and forces its opposite surface against the adjacent wall of the recess 64 in the supporting element 36. Thus, the aligning and orienting assembly 46 resiliently and detachably mounts the sealed switch 10 in position between the heat shields 26 and 28 and also orients the switch so that the planar surfaces of the flattened end portions 14a and 16a of the magnetic reeds 14 and 16 extend generally parallel to the plates 26 and 28.

The heat shielding means or plates 26 and 28 control the selective application of heat from the torches 30 and 32 to the areas on the glass housing 12 of the switch 10 in which the depressions 22 and 20 are to be formed. To accomplish this, the heat shield 26 is substantially imperforate except for an arcuate opening 26a (FIG. 3) that is spaced outwardly from the axis of rotation of the plate 26 a distance such that this opening periodically moves into a position disposed between the torch 30 and the area on the housing 12 in which the depression 22 is to be formed (FIG. 9). Similarly, the heat shield 28 is substantially imperforate except for an arcuate slot or opening 28a (FIG. 3) which is spaced outwardly from the axis of rotation of the plate 28 a distance such that it is moved into a position disposed between the flame of the torch 32 and the area on the glass housing 12 in which the depression 20 is to be formed (FIG. 9). Therefore, the glass of the housing 12 is protected from the flames of the torches 30 and 32 during the rotation of the heat shields or plates 26 and 28 except for the periods in which the openings 26a and 28a are interposed between the torch means 30 and 32 and the adjacent portions of the glass housing 12. Although the relative positions of the slots 26a and 28a are such that the flames of the torches 30 and 32 are applied to the housing 12 substantially concurrently (see FIG. 3), the openings 26a and 28a can be staggered peripherally so that the torch means 30 and 32 sequentially apply localized heat to the housing 12.

The two plate 26 and 28 are rotatably mounted on the base or supporting frame 42 by a shaft 84 (FIGS. 1, 3, and 4) to which a pair of collars or small circular plates 86 and 88 are secured, as by set screws. The plate 26 is secured to the collar 86 by a plurality of machine screws 90 (FIG. 6), and the plate 28 is secured to the collar 88 by a plurality of machine screws 92. By loosening the set screws (not shown), the positions of the collars 86 and 88 and the connected plates 26 and 28 can be adjusted relative the shaft 84.

The opposite end portions of the shaft 84 are rotatably mounted by bearings (not shown) carried on two supporting elements or standards 94 and 96 (FIG. 1) which are secured at their lower ends by a plurality of machine screws 98 and 100 to two blocks 102 and 104, respectively, that are carried on the base plate 42. A pair of collars 106 and 108 secured to the shaft 84 adjacent the left-hand and right-hand surfaces of the standards 94 and 96, respectively, prevent axial movement of the shaft 84 relative to the base member 42.

The shaft 84 is rotated by drive means or an electric motor 110 (FIGS. 1, 3, and 4) that is secured to a member 112 by a plurality of machine screws 114. The member 112 is secured to the base member 42 by a fastening block 116 and a plurality of machine screws 118. The drive shaft 110a of the motor 110 extends outwardly through an opening 112a (FIG. 1) in the member 112 and is secured to a drive pulley 120. A resilient drive belt 122 passes around the pulley 120 and also around a pulley 124 secured to one end of the shaft 84. Whenever the motor 110 is energized, the plates 26 and 28 are continuously rotated. If desired, a speed change or control mechanism can be interposed between the output shaft 110a of the motor 110 and the drive system including the components 120, 122 and 124. Alternatively, an electric motor speed control means can be provided for the motor 110 to control the speed at which the plates 26 and 28 are rotated.

The heat for softening the glass of the housing 12 to form the depressions 20 and 22 is provided by the torch means 30 and 32 which are substantially identical. Each of these torch means includes a nozzle 130 (FIG. 1) connected to a fluid conveying means 132 by a threaded coupling 134. The line 132 is supplied with a proper mixture of oxygen and gas in a sufficient quantity and at a pressure designed to provide a flame projecting toward one of the heat shields or plates 26 and 28. The nozzle 130 in the torch means 30 is disposed in a position substantially aligned with the area on the housing 12 in which the depression 22 is to be formed and is in substantial alignment with the path of movement of the opening 26a in the plate 26. Similarly, the nozzle 130 in the torch means 32 is disposed somewhat above the nozzle 130 (FIG. 1) in the torch means 30 to be positioned in alignment with the area on the housing 12 in which the depression 20 is to be formed. Thus, the nozzle 30 in the torch means 32 and the flame produced thereby are substantially aligned with the path of movement of the opening 28a in the heat shield 28.

Substantially identical means are also provided for adjustably positioning the torch means 30 and 32 on the supporting means 94 and 96. This adjustable supporting or mounting means includes a plate 136 (FIG. 3) that is secured to the upper end of each of the standards 94 and 96. An adjusting block 138 is mounted on the upper surface of each of the plates 136 by a plurality of machine screws 140 which pass through elongated openings or slots 142 (FIG. 4) in the adjusting block 138 to be threadedly received in the plate 136. A transverse supporting arm 144 is clamped to the upper surface of the adjusting block 138 by a plurality of machine screws 146 which extend through elongated slots 148 in the arm 144 to be threadedly received within the block 138. A plurality of pins 150 (FIG. 4) carried on the block 138 bear against the edge of the adjusting arm 144 to guide reciprocating movement thereof during adjustment. The nozzle 130 of each of the torch assemblies 30 and 32 is clamped to the outer end of one of the arms 144 by a somewhat L-shaped plate 152 that is secured to the arm 144 by a machine screw 154. A flange or leg 152a on the plate 152 lies beneath the nozzle 130 to clamp this nozzle against a recess formed in the free end of the arm 144.

To adjust the position of the nozzle 130 in either of the torch means 30 or 32, the machine screws 146 are loosened, and the arm 144 is moved toward or away from the axis of the shaft 44 (FIG. 4) so that the flame produced by the nozzle 130 is properly aligned with the related one of the openings 26a or 28a and the corresponding area on the glass housing 12 of the switch 10. This reciprocating movement is guided by the guide pins 150 which bear against one edge of the adjusting arm 144. When the nozzle 130 has been adjusted to its desired position, it is retained in this position by tightening the machine screws 146. Similarly, when it is desired to adjust the nozzle 130 toward and away from the related one of the heat shields or plates 26 or 28, the machine screws 140 are loosened, and the adjusting block 138 carrying the rigidly secured adjusting arm 144 is reciprocated toward or away from the related one of the plates 26 or 28. To guide this movement, a plate 156 is secured to one edge of the plate 136 by a plurality of machine screws 158 in a position to engage one edge of the adjusting block 138. When the position of the nozzle 130 has been adjusted, it is retained in this position by tightening the machine screws 140.

The general method used in forming the depressions 20 and 22 in the walls of the glass housing 12 is that of applying localized heat in controlled quantities to the desired areas on the glass. This softens the glass at these points and permits it to move inwardly under the pressure of the flames of the torches 30 and 32 and the pressure differential existing across the walls of the housing 12 due to the subatmospheric pressure in the cavity 18 at the switch 10. The pressure differential existing across the wall of the housing 12 is sometimes so great that the mass of softened or plastic glass forced inwardly to produce the depressions or projections 20 and 22 is not stopped by engaging the end portions 14a and 16a or by the partial cooling of this glass caused by the heat removed by these elements. If the softened glass continues to move inwardly after engaging the end portions 14a and 16a these end portions are moved toward each other to reduce the gap between these elements, and the operating characteristics of the sealed switch 10 are changed. It has been determined that the size of the depressions 20 and 22 or the degree to which these depressions project inwardly into the cavity 18 can be controlled by preheating the switch 10 prior to the application of the localized heat used to soften the portions of the glass forming the depressions 20 and 22. When the sealed switch 10 is preheated, the pressure within the cavity 18 is increased to reduce the pressure differential across the walls of the housing 12. This directly controls the force operating to displace the plastic or softened glass. This heating is not sufficient to soften any of the glass in the housing 12.

When the depressions 20 and 22 are to be formed in a sealed switch of the usual construction in which damping means for the magnetic elements 14 and 16 are not provided, one or more of the usual type of sealed switch units is preheated to a temperature determined by the normal pressure within the cavity 18 and the type and thickness of the glass forming the housing 12. In a number of sealed switches 10 manufactured in accordance with the present invention, the switch units are preheated to a temperature around 300–600° F. After the torch means 130 are ignited to provide flames projecting inwardly to impinge on the outer surfaces of the heat shielding means or plates 26 and 28, the drive motor 110 is placed in operation so that the shaft 84 and the plates 26 and 28 are continuously rotated.

Figure 6:
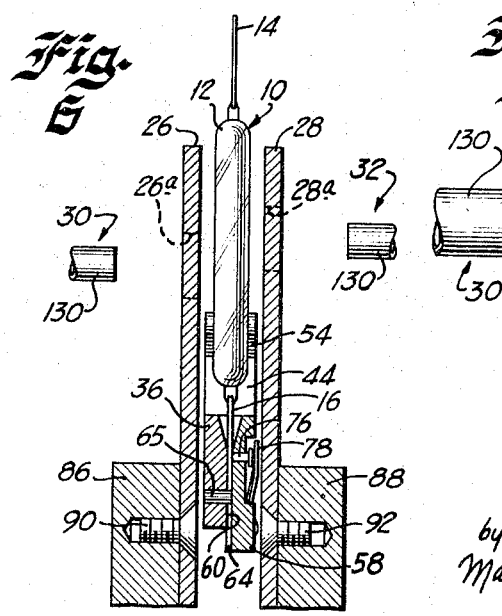
FIG. 6 is an enlarged fragmentary sectional view taken along line 6—6 in FIG. 5.

One of the preheated switches is then inserted into the holding fixture 36 to be supported in the manner illustrated in FIG. 6 with the portion of the glass housing that is to form the depression 22 disposed adjacent the path of movement of the opening 26a in the plate 26 and with the portion of the glass housing that is to form the depression 20 disposed adjacent the path of movement of the opening 28a in the plate 28. During the rotation of the plates 26 and 28, the openings 26a and 28a move into positions of alignment between the nozzles 130 of the torches 30 and 32 and the housing 12 so that flame from the nozzle 130 in the torch means 20 impinges on the glass of the housing 12 adjacent the inner end 16a of the reed 16 (FIG. 9). Similarly, the flame from the nozzle 130 in the torch means 32 passes through the opening 28a to impinge on the glass of the housing 12 adjacent the inner end 14a of the magnetic reed 14. This heat is applied for a period of time determined by the speed of rotation of the plates 26 and 28 and the lengths of the openings 26a and 28a. The heat applied by the flames softens the glass of the housing 12 so that the flame pressure and the pressure differential previously established by preheating the switch displace the glass inwardly in the manner illustrated in FIG. 9 to form the depressions 20 and 22. After the plates 26 and 28 have been rotated to move the openings 26a and 28 beyond the nozzles 130, the switch 10 with the depressions 20 and 22 therein is removed, and another preheated switch is inserted to permit depressions to be formed therein during the next cycle of rotation or operation of the apparatus 24.

The inward movement of the softened or plastic glass forming the depressions 20 and 22 is resisted by the mechanical engagement of the glass with the planar surfaces of the inner ends 14a and 16a of the magnetic reeds 14 and 16. In addition, the magnetic elements 14 and 16 operate as heat sinks to remove heat from the softened glass and tend to partially cool or solidify the glass. This also tends to resist further inward movement. These two factors are effective to prevent excessive inward movement of the glass and the consequent displacement of the reeds 14 and 16 from their normal positions because of the prior preheating of the switch 10 to lower pressure differential acting on the walls of the glass housing 12.

When the completed switch is removed from the apparatus 24, the softened glass forming the depressions 20 and 22 is further cooled until this glass becomes solidified to place the depressions in permanent form. Although separate cooling means can be provided, the heat loss to the atmosphere is normally adequate to return the previously softened portions of the housing 12 to a solid state in a short period of time.

The method of the present invention can also be carried out under certain conditions without requiring the preheating of the sealed switches 10 so that the depressions or "dimples" 20 and 22 can be formed in a single operation. To do this, the torch means 30 and 32 are adjusted to provide a "soft" or low temperature flame when compared with the temperature of the flame normally used in carrying out the method. The lengths of the openings 26a and 28a and/or the speed of rotation of the heat shields 26 and 28 are adjusted to increase the length of time that the flames from the torch means 30 and 32 impinge on the glass of the housing 12. The low temperature of the flames coupled with the increased period of application of the flames results in substantial heating of the atmosphere within the switch to increase its pressure prior to the time at which the glass in the areas engaged by the flames becomes softened. In this manner, the desired pressure differential across the wall of the housing 12 is established by slow flame heating before the flames soften the glass enough to permit it to be displaced inwardly by the established differential in the manner described above. The establishment of the desired pressure differential is controlled by adjusting the temperature of the flame and the time interval in which the flame is applied to the glass housing.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. An apparatus for forming a depression in a predetermined area of the glass housing of a sealed switch comprising a rotatably mounted member having an opening therein movable through a given path, holding means for supporting a sealed switch with the predetermined area on the housing in the path of movement of the opening, heating means disposed adjacent the switch with the member interposed therebetween, and drive means for moving the member so that the opening passes between the heating means and the housing to permit heat to be applied to the housing to form a depression in the predetermined area.

2. An apparatus for making a depression in the wall of the glass housing of a sealed switch comprising switch holding means for supporting the housing of the switch in a predetermined position, heating means disposed adjacent the housing for applying heat to a predetermined area of the housing, a movably mounted member interposed between the heating means and the housing, said member having an opening therein, and means for moving said member to move the opening through a position aligned with the heating means and the housing so that the heating means applies heat to the predetermined area of the housing for a controlled period of time to produce the depression.

3. An apparatus for forming a depression in a given area on the glass housing of a sealed switch comprising a member rotatably mounted about a fixed axis and having an arcuately extending opening therein, holding means mounting a sealed switch adjacent the member offset from the axis of rotation with the given area in the path of movement of the arcuate opening, torch means having a flame directed toward the given area on the housing with the member interposed therebetween, and means for rotating the member so that the opening passes between the housing and the flame to permit the flame to form the depression in the housing.

4. An apparatus for making a depression in the wall of the glass housing of a sealed switch comprising switch holding means for supporting the housing of the switch in a predetermined position, torch means spaced from the housing and providing a flame directed toward the predetermined area, a rotatably mounted member interposed between the housing and the flame, said member having an opening movable into a position disposed between the flame and the predetermined areas, and drive means for rotating the member.

5. An apparatus for making sealed switches of the type having two magnetic elements sealed in a dielectric housing, a pair of heating means producing oppositely directed flames, supporting means for supporting a switch, shielding means mounted in a position interposed between the flames and the switch and having two openings disposed on opposite sides of the housing of the switch, and means connected between the supporting means and the shielding means for producing relative movement between the supporting means and the shielding means so that the flames pass through the openings to impinge on the housing for controlled periods of time.

6. An apparatus for making depressions in the glass housing of a sealed switch comprising a pair of torches spaced from each other and providing oppositely directed flames, holding means supporting the housing of a sealed switch between and in a position to be heated by the flames of the torches, and a pair of apertured and movably mounted members disposed between the housing and the flames of the two torches to control the heating of the housing by the flames.

7. An apparatus for making depressions in the glass housing of a sealed switch comprising a pair of torches spaced from each other and providing oppositely directed flames, holding means supporting the housing of a sealed switch between and in a position to be heated by the flames of the torches, a pair of rotatably mounted members each having an opening therein, each of said members being interposed between the housing and one of the torches, and drive means coupled to the members for rotating the members relative to the housing to move the openings therein into alignment with the flames to control the heating of the housing by the flames.

8. An apparatus for forming depressions at spaced areas on the glass housing of a sealed switch comprising a holding means for removably supporting a switch, a plurality of torch means each having a flame directed toward one of the spaced areas, a heat shielding structure disposed between the torch means and the switch and having a plurality of openings, and drive means coupled to the heat shielding structure for moving the heat shielding structure relative to the sealed switch so that the openings pass between the flames of the torch means and the housing to form the depressions in the spaced areas on the housing.

9. An apparatus for making depressions in spaced areas of the glass housing of a sealed switch comprising a pair of spaced heat shields rotatable about a common axis and spaced from each other along the axis, said spaced heat shields each having an elongated opening therein, holding means for mounting a sealed switch between the heat shields at a position offset from the axis, a pair of torches disposed on opposite sides of the heat shields and each providing a flame directed inwardly toward one of the spaced areas on the housing, and drive means for rotating the heat shields to move the elongated openings between the flames and the housing to permit the controlled heating of the spaced areas.

10. An apparatus for forming depressions in a glass housing comprising a pair of supporting structures, a pair of generally circular plates mounted between the supporting structures for rotation about a common axis and spaced from each other along the axis, each of said plates having an elongated opening spaced outwardly from the axis of rotation, holding means for supporting a switch between the plates with each of the spaced areas aligned with the path of movement of one of the openings, a pair of torch means mounted on the supporting structures on opposite sides of the plates and each providing a flame directed toward one of the spaced areas, and drive means for rotating the plates so that the torch means apply controlled amounts of heat to the spaced areas of the housing to form the depressions.

11. A method of forming depressions in the glass housing of a switch including a pair of magnetic elements sealed at least partially within the housing at a subatmospheric pressure, which method comprises the steps of heating the switch to increase the pressure within the sealed housing without rendering the glass housing plastic, and then applying localized heat to an area of the housing to soften the glass in this area to permit it to move inwardly an amount determined at least in part by the pressure within the housing.

12. A method of forming depressions in the glass housing of a switch including a pair of magnetic elements sealed at least partially within the housing at a subatmospheric pressure, which method comprises the steps of heating the switch to increase the pressure within the sealed housing to a value above its normal value without softening the glass housing, disposing the heated switch in an atmosphere having a pressure above the pressure in the sealed housing of the heated switch, and applying localized heat to the area of the housing in which the depression is to be formed to soften the glass so that it is displaced inwardly into the housing an amount determined at least in part by the pressure differential existing across the glass housing to form the depression.

13. A method of forming depressions or projections in the glass housing of a sealed switch in which the inner ends of a pair of magnetic elements are sealed, the interior of the sealed housing having a pressure below atmospheric pressure, which method comprises the steps of heating the sealed switch to increase the pressure within the sealed housing to a value above the normal pressure within the housing and below atmospheric pressure, and applying localized heat to a given area of the glass housing to soften the glass in the given area so that it is displaced inwardly into the housing by the pressure differential across the glass housing to form a projection or depression engaging or disposed immediately adjacent the inner end of one of the magnetic elements.

14. A method of forming depressions or projections in the glass housing of a sealed switch in which the inner ends of a pair of magnetic elements are sealed, the interior of the sealed housing having a pressure below atmospheric pressure, which method comprises the steps of heating the sealed switch to increase the pressure within the sealed housing to a value above the normal pressure within the housing and below atmospheric pressure, applying localized heat to a given area of the glass housing to soften the glass in the given area so that it is displaced inwardly into the housing by the pressure differential across the glass housing to form a projection or depression engaging the inner end of one of the magnetic elements, and conducting heat away from the softened glass of the housing through the magnetic element to retard further displacement of the softened glass.

15. A method of forming a depression in a wall of a glass housing of a sealed switch, which comprises the steps of applying heat to a sealed glass housing which is at ambient temperature and in which is sealed an atmosphere at a given normal pressure less than atmospheric pressure at ambient temperature, controlling the temperature and rate at which heat is applied to the glass housing such that the temperature within the sealed glass housing increases to a point at which a given and predetermined pressure differential exists between the atmosphere sealed within the housing and the ambient atmosphere before the glass of the housing at the point at which the depression to be made softens to the point at which it can be displaced, displacing the softened glass inwardly under the force of the pressure differential existing between the pressure of the ambient atmosphere and the desired pressure of the atmosphere sealed in the housing to form the depression, and cooling the switch to solidify the depression and return the pressure of the atmosphere sealed in the housing to its normal value.

References Cited

UNITED STATES PATENTS 2,816,399  12/1957  Soltysik _____ 65—109
3,189,423   6/1965  Paione _____ 65—105

DONALL H. SYLVESTER, *Primary Examiner.*

A. D. KELLOGG, *Assistant Examiner.*